(12) United States Patent
Zuberi

(10) Patent No.: US 7,566,425 B2
(45) Date of Patent: Jul. 28, 2009

(54) REFRACTORY EXHAUST FILTERING METHOD AND APPARATUS

(75) Inventor: Bilal Zuberi, Cambridge, MA (US)

(73) Assignee: GEO2 Technologies, Inc, Woburn, MA (US)

( * ) Notice: Subject to any disclaimer, the term of this patent is extended or adjusted under 35 U.S.C. 154(b) by 24 days.

(21) Appl. No.: 11/620,073

(22) Filed: Jan. 5, 2007

(65) Prior Publication Data

US 2007/0104632 A1    May 10, 2007

Related U.S. Application Data

(60) Division of application No. 11/276,524, filed on Mar. 3, 2006, now Pat. No. 7,211,232, which is a continuation of application No. 11/164,005, filed on Nov. 7, 2005, now abandoned.

(51) Int. Cl.
*B01D 50/00* (2006.01)
*B01D 39/06* (2006.01)

(52) U.S. Cl. .......................................... 422/180; 55/523

(58) Field of Classification Search ................. 422/168, 422/180; 55/485, 523; 428/285; 60/297
See application file for complete search history.

(56) References Cited

U.S. PATENT DOCUMENTS

| | | | |
|---|---|---|---|
| 4,420,316 A | | 12/1983 | Frost et al. |
| 5,080,963 A | | 1/1992 | Tatarchuk et al. |
| 5,211,145 A | | 5/1993 | Ichikawa et al. |
| 5,298,046 A | * | 3/1994 | Peisert .......................... 55/486 |
| 5,348,987 A | | 9/1994 | Kato et al. |
| 5,541,147 A | | 7/1996 | Friedlander et al. |
| 5,569,423 A | | 10/1996 | Belunova et al. |
| 5,597,771 A | | 1/1997 | Hu et al. |
| 5,943,857 A | | 8/1999 | Ansell et al. |
| 6,087,298 A | * | 7/2000 | Sung et al. ................... 502/333 |
| 6,159,893 A | * | 12/2000 | Kondo .......................... 502/251 |
| 6,203,770 B1 | | 3/2001 | Peter-Hoblyn et al. |
| 6,238,467 B1 | | 5/2001 | Azarian et al. |
| 6,613,299 B2 | | 9/2003 | Dang et al. |
| 6,722,124 B2 | | 4/2004 | Pawson et al. |
| 6,946,013 B2 | | 9/2005 | Alward et al. |
| 7,062,904 B1 | | 6/2006 | Hu et al. |
| 7,067,092 B2 | | 6/2006 | Hall et al. |
| 7,179,430 B1 | | 2/2007 | Stobbe et al. |

(Continued)

FOREIGN PATENT DOCUMENTS

EP    0588182    5/1995

OTHER PUBLICATIONS

Anderson, Michael J., "Ultra Thin Wall Mat Design and Optimization with Hybrid Mats", *SAE Technical Paper Series 2004-01-0145*, (Mar. 2004).

(Continued)

*Primary Examiner*—Tom Duong

(57) ABSTRACT

An apparatus for catalytically cleaning an exhaust gas, including receiving the exhaust gas in an inlet channel, blocking the exhaust gas in the inlet channel, diffusing the exhaust gas through a porous substantially fibrous nonwoven wall of the inlet channel, reacting the exhaust gas with at least one catalyst material to at least partially remove nitrous oxides, hydrocarbons and carbon monoxide therefrom, the at least one catalyst material being disposed on the porous wall, trapping particulate matter in the porous substantially fibrous nonwoven wall, receiving the diffused exhaust gas into an outlet channel, and transitioning the exhaust gas from the outlet channel to the atmosphere.

13 Claims, 11 Drawing Sheets

U.S. PATENT DOCUMENTS

| | | |
|---|---|---|
| 7,229,597 B2 | 6/2007 | Patchett et al. |
| 2002/0189247 A1* | 12/2002 | Kato et al. .................. 60/297 |
| 2003/0180205 A1 | 9/2003 | Carlborg et al. |
| 2004/0261384 A1 | 12/2004 | Merkel et al. |
| 2005/0031514 A1 | 2/2005 | Patchett et al. |
| 2005/0042151 A1 | 2/2005 | Alward et al. |
| 2006/0057046 A1 | 3/2006 | Punke et al. |
| 2006/0107649 A1 | 5/2006 | Kamikawa et al. |
| 2006/0120936 A1 | 6/2006 | Alive et al. |
| 2006/0120937 A1 | 6/2006 | Zuberi |
| 2006/0191248 A1 | 8/2006 | Bardhan et al. |
| 2007/0107395 A1 | 5/2007 | Zuberi et al. |
| 2007/0140928 A1 | 6/2007 | Beall et al. |
| 2007/0269352 A1 | 11/2007 | Miyairi et al. |

OTHER PUBLICATIONS

Gulati, Suresh T., "Physical Durability of Thin Wall Ceramic Substrates", *SAE Technical Paper Series 982635*, (Oct. 1998).

Lavoie, George A., et al., "Experimental and Theoretical Study of Nitric Oxide Formation in Internal Combustion Engines", *Combustion Science and Technology*, (1970).

\* cited by examiner

REFRACTORY EXHAUST FILTERING METHOD AND APPARATUS

CROSS-REFERENCE TO RELATED APPLICATIONS

This application is a divisional to U.S. patent application Ser. No. 11/276,524 filed Mar. 3, 2006, now U.S. Pat. No. 7,211,232 which is a continuation to U.S. patent application Ser. No. 11/164,005 filed Nov. 7, 2005, now abandoned both incorporated by reference herein.

BACKGROUND

1. Field

The present invention relates generally to a catalytic device for reducing the pollution content of an exhaust gas.

2. Description of Related Art

Exhaust systems perform several functions for a modern engine. For example, the exhaust system is expected to manage heat, reduce pollutants, control noise, and sometimes filter particulate matter. Generally, these individual functions are performed by separate and distinct components. Take, for example, the exhaust system of a typical gasoline engine. The engine exhaust system may use a set of heat exchangers or external baffles to capture and dissipate heat. A separate muffler may be coupled to the exhaust outlet to control noise, while a catalytic converter assembly may be placed in the exhaust path to reduce non-particulate pollutants. Although today particulates are not generally the pollutants focused upon in the gasoline engine, it is likely that more restrictive regulations may soon apply.

An exhaust system for a modern gasoline engine is nearly universally required to remove or eliminate some of the non-particulate pollutants from the exhaust gas stream, and therefore might employ a known emissions control device, such as three-way catalytic converter. Such a three-way converter uses chemical oxidation and reduction processes to remove non-particulate pollutants from the exhaust gas stream. The known catalytic (or metal) converter holds a catalytic material that, when sufficiently heated, reacts with exhaust gassed to lower the chemical potential to react non-particulate pollutants into non-pollutants. More particularly, the known converter uses a flow-through design where exhaust gasses enter one end of the converter, flow through open parallel channels, come into contact with a catalyst for converting some of the pollutants in the exhaust gas stream into non-pollutants before ultimately flowing out into the atmosphere. As the exhaust gas flows through the channels, laminar flows are created which cause the exhaust gases to flow down the channel and, due to concentration gradient and mass-transfer effects, come into contact with the catalyst residing on the channel walls. The channel walls have the catalytic material disposed on their surfaces, and as the hot exhaust gas contacts the channel walls, the walls are heated to elevate the catalytic material to the a threshold temperature above which the catalyzed reactions readily occur. This is colloquially known as the 'light-off' temperature. Likewise, the time it takes for the light-off temperature to be reached is known as the 'light-off' period. Then, as the exhaust gas continues to flow, the catalytic material interacts with the pollutants in the exhaust gas to facilitate the conversion thereof into non-polluting emissions. About 50% of the pollution generated from and emitted by modern engines equipped with catalytic converters occurs during this light-off period when the converter is essentially non-operational. In certain vehicle applications, such as stop and go traffic and short trips in cities, the overall usefulness of the catalytic converter to reduce pollution is mitigated since the converter spends a significant amount of time at temperature below catalyst light-off or relating to low conversion efficiencies.

The action of moving the exhaust gas through open channels and transporting the pollutants to the channel walls occurs via a gaseous diffusion mechanism. Once the catalyst has reached its activation temperature, the reaction rate is dependant on the rate of mass transfer from the bulk of the gas stream (center of the laminar gas flow) to the walls. As the catalyzed pollutant-eliminating reactions occur at the wall-gas interface (where the catalyst is typically located), a concentration gradient of pollutants is generated in the exhaust gas stream. A boundary layer develops and, being the slowest process under such conditions, mass-transfer principles dictate the overall rate of the reaction. Since bulk diffusion is a relatively slow process, the number of open channels is typically increased to compensate, and increase the overall reaction rate. The effect is essentially to reduce the distance that the gas molecules have to travel to diffuse from the bulk into the boundary layer. Additionally, the relatively limiting bulk diffusion step may be compensated for by making the converter in a honeycomb design or by otherwise increasing the effective catalytic surface area. By simultaneously reducing the size of the open channels and increasing the number of channels, the bulk diffusion rate may effectively be increased and the efficiency of the converter improved. However, making such a "closed-cell" honeycomb design results in a decrease in the thickness, and thus the strength, of the cell walls and an increase in the backpressure to the engine. Thus, the converter is made more fragile while the fuel economy of the vehicle is simultaneously decreased. Accordingly, there are practical limits on the minimum size of the open channels that restrict the ability to significantly improve the bulk transfer rate of traditional monolithic honeycomb converters past a certain point.

Thus, due to the inefficiency of the bulk transfer process the converter is typically made quite large and is therefore heavy, bulky and relatively slow to heat to the threshold catalytic operating temperature. Typically, several catalytic converters may be arranged in a sequential order to improve overall emission control.

Known three-way gasoline catalytic converters do not filter particulate matter. Recent studies have shown that particulates from a gasoline ICE (internal combustion engine) may be both dangerous to health and generated at quantities roughly equal to post-DPF (diesel particulate filter) PM (particulate matter) emission levels. As PM emissions standards are tightened, both diesel and gasoline engines will have to be further modified to reduce PM emissions. Some European agencies are already considering the regulation of gasoline PM emissions.

Most, if not all, catalytic systems do not efficiently or effectively operate until a threshold operational temperature is reached. During this "light-off" period, substantial amounts of particulate and non-particulate pollution are emitted into the atmosphere. Accordingly, it is often desirable to place a catalytic device as close as possible to the engine manifold, where exhaust gasses are hottest and thus light-off time is shortest. In this way, the catalyst may more quickly extract sufficient heat from the engine exhaust gasses to reach its operational temperature. However, materials, design and/or safety constraints may limit placement of the catalytic converter to a position spaced away from the manifold. When the catalytic converters are spaced away from the manifold, light off time is increased, and additional pollutants are thus exhausted into the atmosphere.

The most popular design for catalytic converters is currently the monolithic honeycomb wherein the monolithic material is cordierite and silicon carbide. In order to be increasingly effective, the cell density of the cordierite monolithic honeycomb design has been increased by making the individual channel walls thinner and increasing the number of channels per unit area. However, the strength of the walls (and, thus, the monolithic converter) decreases with decreasing wall thickness while the backpressure increases (and engine efficiency and mileage correspondingly decreases) with increasing cell density; thus, a practical limit for increasing converter efficiency exists and is defined by a minimal monolith strength and a maximum allowable backpressure provided by the unit. Another approach to addressing increasingly stringent emission standards is to utilize known three-way gasoline catalytic converters arranged in multiple stages to obtain reasonable emission control of multiple pollutants. However, this approach also adds to cost, weight, fuel penalty and engineering complexity. Thus, in an increasingly stringent emissions regulatory environment, there is a need to find an effective way to reduce harmful emissions from a typical ICE.

Thus, air pollution standards, particularly in regard to vehicle exhaust gasses, are coming under increased pressure from governments and environmental organizations. The consequence of continued emissions is well recognized, and additional regulations are being added while existing regulations are being more aggressively enforced. However, reduced emissions and more stringent emission regulations may have a short-term negative impact on the overall economy, as additional monies must be spent to meet higher standards. Indeed, governments have been relatively slow to adapt tighter regulations, citing competitive and economic consequences. Accordingly, a more cost effective and effective catalytic device may ease the transition to a cleaner world, without substantial detrimental economic effects. In particular, it would be desirable to provide a cost effective catalytic device for removing both particulate pollutant matter and non-particulate pollutants from an exhaust stream that is capable of easy installation on vehicles, small engines, and in industrial exhaust stacks. It would also be desirable for such a device to be able to catalyze chemically important reactions that may not be considered as pollution control, such as chemical synthesis, bioreactor reactions, gas synthesis etc. The present invention addresses this need.

SUMMARY

Briefly, the present invention provides an internal combustion engine exhaust system for catalytically converting carbon monoxide, nitrous oxide, and hydrocarbon pollutant species into non-pollutant species (such as carbon dioxide, molecular nitrogen, and water) and for trapping particulate matter. In general the device is capable of separating condensed material from a fluid stream and at the same time supporting reactive agents (such as membranes, polymers, hydrophobic materials, hydrophilic materials, catalysts, etc) that can enhance reaction rates of constituents in the fluid stream. The engine system includes an internal combustion engine exhaust (such as from a gasoline, diesel or other fuel engine), a catalytic converter having a housing, an inlet port formed in the housing and fluidically connected to the engine exhaust and an outlet port formed in the housing and fluidically connected to the atmosphere. The catalytic converter also includes a plurality of inlet channels in the housing, a plurality of outlet channels arranged adjacent to the inlet channels, a plurality of substantially fibrous non-woven porous walls separating the inlet channels from the outlet channels, and typically a waschoat disposed on the porous walls, a first reactive agent or catalyst material disposed on the porous walls, and a second reactive agent or catalyst material disposed on the porous walls.

In a more specific example, the catalytic device itself is constructed as a having a plurality of inlet channels and outlet channels arranged in an alternating pattern, a substantially fibrous non-woven porous wall between respective adjacent inlet and outlet channels, a surface area enhancing washcoat with stabilizers and additives disposed on the fibers constituting the substantially fibrous non-woven porous walls, a catalyst portion disposed on the substantially fibrous non-woven porous walls, an inlet port coupled to the inlet channels, an outlet port coupled to the outlet channels, an inlet block in at least some of the inlet channels, each inlet block positioned in respective inlet channels and between the inlet port and the outlet port, and an outlet block in at least some of the outlet channels, each outlet block positioned in respective outlet channels and between the inlet port and the outlet port. In another specific example, the catalytic device is constructed as a monolithic nonwoven substantially fibrous block having an inlet end and an outlet end. The inlet channels and outlet channels are arranged in an alternating pattern in the block with a porous wall positioned between adjacent inlet and outlet channels. The inlet and outlet channels may run parallel to each other, perpendicular to each other or in some other configuration. A catalyst is disposed on the porous walls, such that the walls of the pores inside the porous wall contain catalyst for reaction with gases and solid particulates, and an inlet block is included in each respective inlet channel and positioned at the outlet end while an outlet block is included in each respective outlet channel and positioned at the inlet end. The blocks force the fluid stream through the substantially fibrous non-woven porous refractory material.

Advantageously, the catalytic device provides a method for removing particulate matter and carbon monoxide, nitrous oxide, and hydrocarbon pollutants and for trapping particulate matter from the exhaust stream of an engine. This is done by directing an exhaust gas stream from an engine through a substantially fibrous nonwoven filter, catalyzing the conversion of hydrocarbon pollutants into carbon dioxide and water, catalyzing the conversion of carbon monoxide into carbon dioxide, catalyzing the conversion of nitrogen oxide into molecular nitrogen gas, and extracting particulate matter from the exhaust gas stream via filtration. The particulate matter may later be burnt off during regeneration process in the presence or absence of catalysts, heaters and other devices.

These and other features of the present invention will become apparent from a reading of the following description, and may be realized by means of the instrumentalities and combinations particularly pointed out in the appended claims.

DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Figure 1:
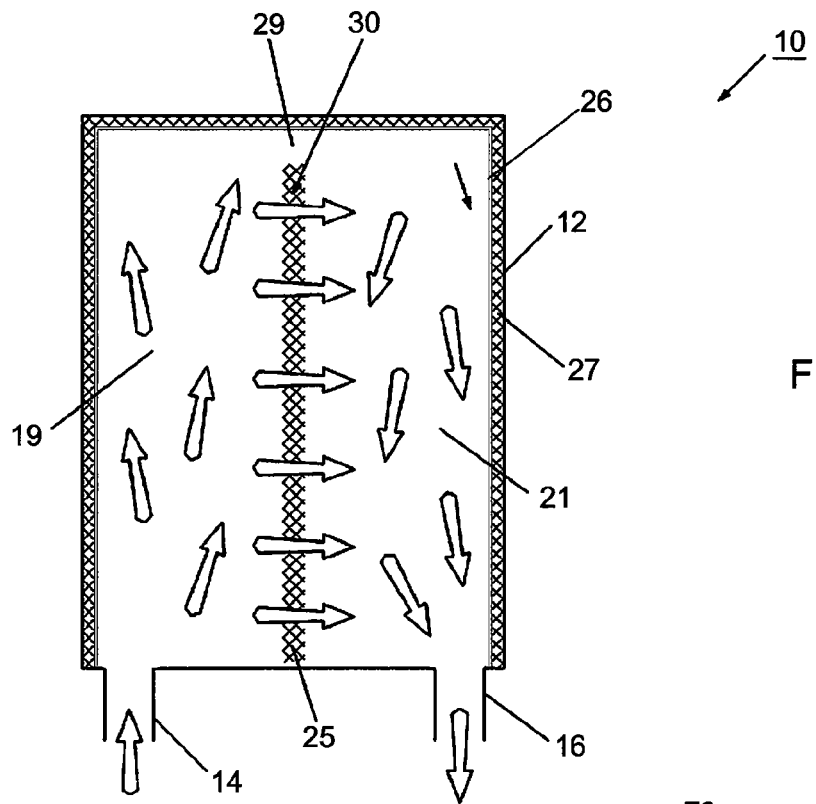
FIG. 1 is a diagram of a catalytic device in accordance with the present invention.

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

The drawing figures herein illustrate and refer to an exhaust system pathway that is specifically described as a component of an internal combustion engine exhaust system. However, it should be appreciated that the exhaust pathway may be used with other types of exhaust systems. For example, the exhaust system pathway may be used in petrochemical, air-filtration, hot-gas filtration, chemical synthesis, biomedical, chemical processing, painting shops, laundromat, industrial exhaust, generation plant, or commercial kitchen exhaust applications.

Generally, a catalytic converting device consists of a host or a structural substrate support, and a catalyst that at least partially coats the support. Often the catalyst components reside on a washcoat that includes surface area enhancers, surface modifiers, stabilizers and oxygen storage components. A catalytic device contains the appropriate type and mass of support and catalyst so that it can fulfill a precise catalytic function under the desired operating conditions and environment. For example, the catalytic device may facilitate a chemical conversion, such as that of a first gaseous species into a second gaseous species, a first liquid species into another liquid species, a liquid species into a gaseous species, or the like. Typically, the chemical conversion reaction or set of reactions are deliberate and well-defined in the context of a particular application, e.g. simultaneous conversion of NOx, HC, and CO into $N_2$, $H_2O$, and $CO_2$, the conversion of MTBE to CO2 and steam, the conversion of soot to CO2 and steam, and the like.

FIG. 1 shows a 4-way catalytic conversion device 10 capable of facilitating multiple catalyzed reactions as well as capable of filtering particulate or condensed matter from a fluid stream. Catalytic device 10 has housing 12 that has inlet port 14 and outlet port 16. For convenience, catalytic device 10 will be described in connection with a gasoline internal combustion engine, but it will be appreciated that it may be used in other types of engines and in industrial, commercial, or residential exhaust applications. Catalytic device 10 features a wall 25 in housing 12. Wall 25 is typically porous, and more typically has a layer of catalytic material 26 disposed on its surface. The positioning of wall 25 arranges inlet channel 19 adjacent to outlet channel 21. When exhaust gas (i.e., a gas having a relatively high pollutant content) from an exhaust gas source (i.e., a gasoline engine or the like) enters inlet port 14, the gas is received in inlet channel 19, and at least some of the gas is moved through porous wall 25. The exhaust gas is typically a product of gasoline combustion and as such is typically relatively hot. In other cases, the gas could be heated externally to bring the catalysts to operating temperatures. The exhaust gas thus first heats porous wall 25 sufficiently to activate the catalyst 26, and, after the activation temperature has been reached, pollutants in the exhaust gas are then catalytically reacted upon contact with the catalyst layer 26. More particularly, the non-particulate gases interact with the catalyst 26 via a pore diffusion 30 mechanism arising from the flow of gas through wall 25. Since the exhaust gas is forced through the walls, the bulk-flow limitation to the reaction is removed and the gas reaction rate is primarily limited by the diffusion of the gas in the pores which is a much smaller distance than the diameter of the channels. The exhaust gas may also experience laminar flow as it flows from inlet channel 19 to outlet channel 21 and in the outlet channel 21. These laminar flows in the outlet channel 21 lead to a bulk diffusion process 32, which further removes non-particulate pollutants. In some constructions, the walls of the housing 12 may include porous wall material 27 (like wall material 25) and a catalyst layer 26, which further improves conversion efficiency and thus allows for a reduction, or even substantially total elimination, of the need for multiple filters/converters arrayed in series in order to sufficiently remove pollutant species from an exhaust gas stream.

Some constructions may have gap 29 between inlet channel 19 and outlet channel 21. The gap 29 enables a flow-through exhaust path from inlet port 14 to outlet port 16. Accordingly, catalytic device 10 may use a combination of wall-flow (i.e., the gas passes through a porous wall) and flow-through (i.e., the gas interacts with the wall but does not pass therethrough) processes to provide catalytic effect. The size and placement of any gap 29 may be set according to backpressure requirements, filtration efficiency required, expected gas flows, and required conversion levels.

The pore size in wall 25 and wall 27 may be selected to trap particulate matter and to catalyze particular reactions. The overall porosity, pore-shape and pore-size distribution may also depend on the washcoat and the catalyst material being used to coat the walls of the substantially fibrous non-woven porous refractory material. The wall(s) 25, 27 may have a pore-size gradient. The highly porous and fibrous nature of the wall(s) 25, 27 allow for the device 10 to be made smaller and lighter than the prior art converters and allow for faster heating and 'light off'. The intertangled refractory fibers making up the walls 25, 27 further contribute to the toughness of the walls 25, 27, making them able to withstand mechanically harsh conditions, such as those close to the engine. This combination of properties allows the device 10 to be positioned closer to the engine than known converter devices, such that the device 10 may be heated to it 'light off' temperature more quickly by the engine gasses and thus begin to function sooner with less pollutants passing therethrough unconverted during its light off phase.

The use of pore diffusion wall flow dramatically increases the efficiency of the catalytic device 10, particularly during light off. As a result of the wall flow design, the exhaust gas is forced to go through the wall and hence the bulk diffusional limitation is severely reduced. Thus, the exhaust gas only needs to diffuse in the pores to reach the catalyst residing on the walls of the pores. That distance is much shorter, and hence the overall conversion efficiency is much higher. The efficiency is further enhanced due to the lower thermal mass of the highly porous walls 25, 27 enabling them to be heated more quickly. The increased efficiency and lower thermal mass enable the catalytic device to be made smaller, or to have less catalytic material and still maintain effective catalytic processes. Such a size and mass reduction saves space, material, and cost, while significantly reducing emission of pollutants due to shorter light off delays. Additionally, the emittance/emissivity of the material can be altered, such as with the application of emittance agents, such as to affect the conversion efficiency and/or for thermal management.

Figure 2:
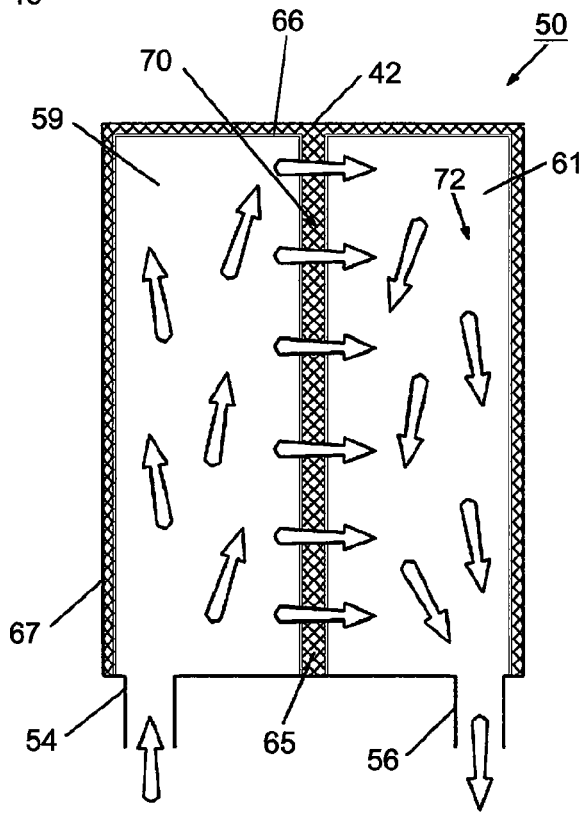
FIG. 2 is a diagram of a catalytic device in accordance with the present invention.

FIG. 2 shows a catalytic device 50 similar to catalytic device 10, except that the inlet channel 59 is fully blocked by fibrous wall 65. In this way the only exhaust path from inlet 54 to outlet 56 is through porous wall 65 via a wall flow, pore-diffusion mechanism 70. The length and porosity of the plugs or blocking material can be altered to meet application requirements.

Figure 3:
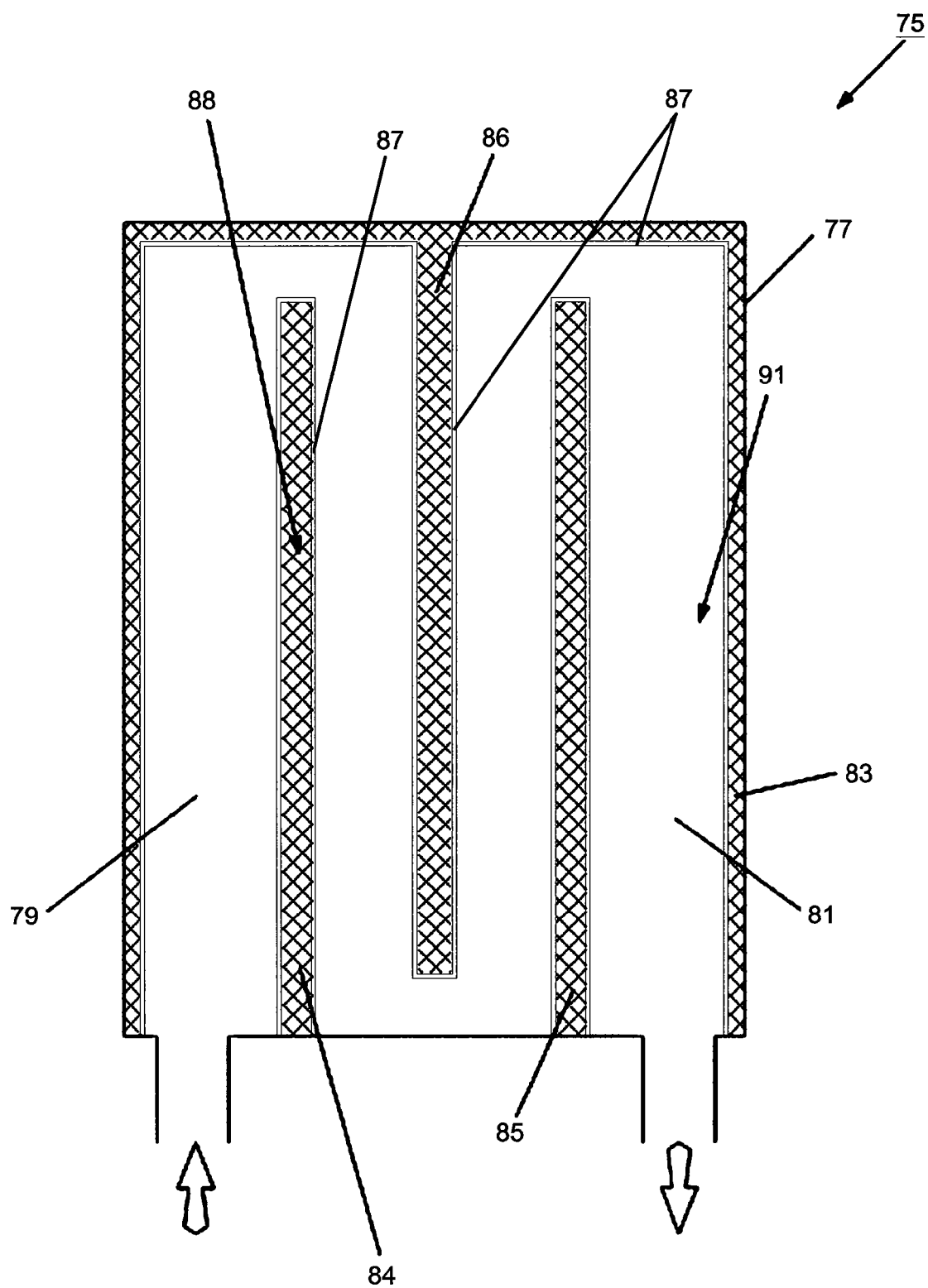
FIG. 3 is a diagram of a catalytic device in accordance with the present invention.

FIG. 3 shows a catalytic device 75 similar to catalytic device 10, except that multiple porous walls 83, 84, 85, 86 are positioned between the inlet channel 79 and the outlet channel 81.

FIG. 4 is a chart 100 which compares a typical known catalytic converter, such as is discussed in the above background section, to a catalytic device such as catalytic device 50. It will be understood that the chart may not be to scale, and may show certain effects in exaggerated form to ease explanation. Chart 100 has a y axis 108 showing "% conversion", while the x axis 106 shows time. Light-off time is defined as the time it takes for the catalysts to reach a conversion efficiency of a defined value (example 50% or 90%). Alternatively, the x axis 106 may indicate temperature of the exhausted outlet gas. More particularly, in the absence of external heating elements, the initial exhaust gas is used to heat the catalytic converter to fully operational temperatures. In other cases, external heating elements may be needed to raise the temperature of the catalysts to the operating range. As the catalytic converter reaches full operational temperature, a steady state temperature is achieved where the heat flow into the system is equivalent to the heat flow out of the system. If the reactions occurring in the catalytic converter are exothermic, the outlet temperature may be higher than the temperature of the inlet gas. For consistency of explanation, FIG. 4 will described with reference to time.

Figure 4A:
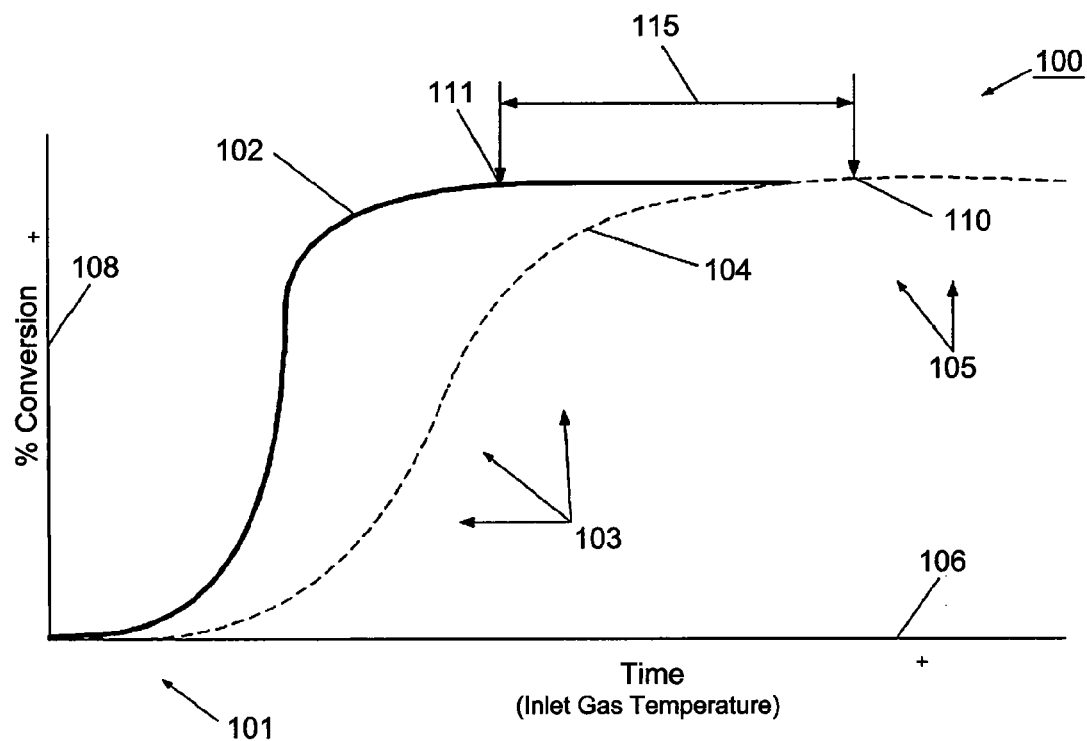
FIGS. 4A, 4B, 4C, and 4D are charts showing light-off time reductions due to use of a catalytic device in accordance with the present invention.

Referring to FIG. 4A, three areas of the chart are indicated. In a first area 101, the conversion rate is mostly a function of the characteristics of the catalyst 66, particularly its activation temperature. Of course, the thermal properties (thermal mass, thermal conductivity, heat capacity and the like) of the substrate 65 also play a part, as it will take longer to heat a larger thermal mass so that the deposited catalyst 66 reaches activation temperature. In area 101, as the exhaust gas heats the catalyst 66, pollutant molecules contacting the catalyst 66 begin to undergo conversion reactions into non-pollutant species; overall, however, such conversion is quite inefficient below the light-off temperature threshold. As the exhaust gas continues to heat the substrate 65, the conversion reaction rates become limited by pore diffusion in area 103. As exhaust gas is pushed into the pores of the substrate 65, more pollutants are brought into contact with the catalyst 66, and the rate of the catalyzed reactions increases. As more of the substrate 65 is heated, the process continues to become more efficient. As the substrate 65 becomes fully heated, the pollutant conversion process becomes limited by bulk diffusion in area 105. As exhaust gasses flow through the typical catalytic device 50, it takes time for laminar flow to fully come to equilibrium. Over time, sufficient concentration gradients are generated which act to pull pollutant molecules into contact with the channel walls 65, 67. Stated somewhat differently, exhaust gas near the walls 65, 67 have reacted with the catalyst 66 and so have a lower concentration of pollutants than gas more near the center of the exhaust channel. This concentration gradient creates an effective urging force that moves the portion of the gas in the center with a higher pollutant concentration toward the lower pollutant concentration wall area. This bulk diffusion effect in laminar flow conditions takes time to reach a steady state, so the curve gradually approaches its conversion limit.

FIG. 4A compares the time it takes a typical prior art catalytic converter to reach a fully operational time 110 to the time it takes a catalytic device 50 to reach a fully operational time 111. The difference is shown as time reduction 115.

Figure 4B:
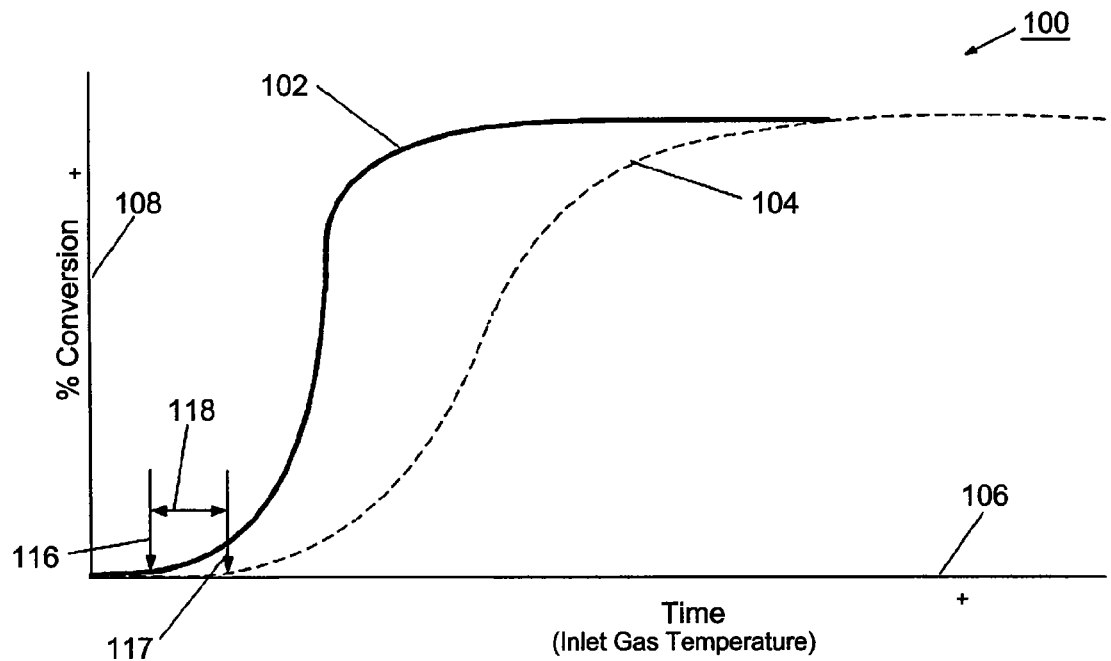

FIG. 4B compares the time 117 it takes to first activate the catalyst in a typical prior art converter to the time 116 it takes to first activate the catalyst 66 in a catalytic device 50. The difference is shown as time reduction 118. The reduced time 118 is primarily a function or effect of the reduced thermal mass of the porous wall substrate in catalytic device 50, which allows the catalytic material 66 to more efficiently reach activation temperature.

Figure 4C:
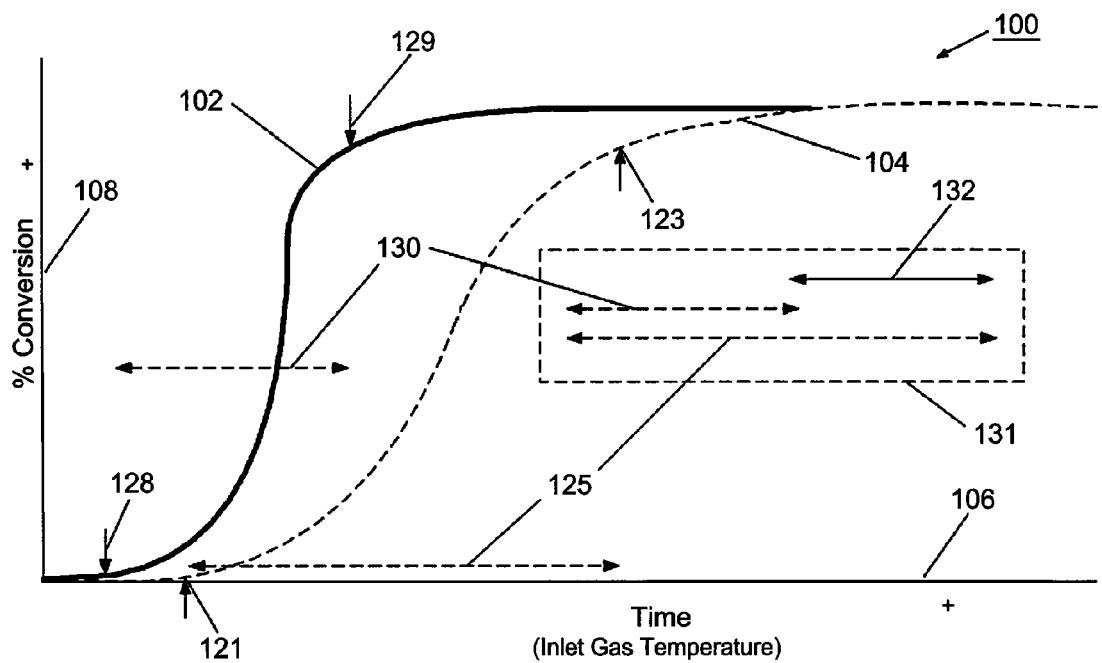

After the catalyst first activates, a catalytic converter goes through a period of time where the rate of the catalyzed reaction is limited primarily by the pore diffusion processes. In other words, once the temperature threshold of the first portion of the catalyst is reached, the rate of the catalyzed reaction is now limited by how fast the gas heating the catalyst may be transported to the remaining catalyst after it has already entered the pores and how fast the gaseous species to be reacted at the catalyst interface can be transported through the porous walls thereto. The pore diffusion effect dominates the reaction rate until sufficient amounts of substrate/catalyst has been heated; at this time, bulk diffusion of the pollutant species to the catalyst on the surface of the substrate becomes the dominant and limiting process. FIG. 4C compares the time 125 when bulk diffusion dominates in a typical converter to the time 131 when pore diffusion dominates in catalytic device 50. The difference is shown as time reduction 132. The reduced time 132 is primarily due to the exhaust path enabled through the porous wall. In catalytic device 50, all exhaust gas is required to pass through porous wall 65. Since the individual fibers in the porous wall 65 are coated with catalyst 66, the reaction rate is substantially increased as pollutant species are transported therethrough via pore diffusion. Further, since the wall 65 is highly porous, and has a low thermal mass, it is more quickly heated to the catalyst activation temperature.

Figure 4D:
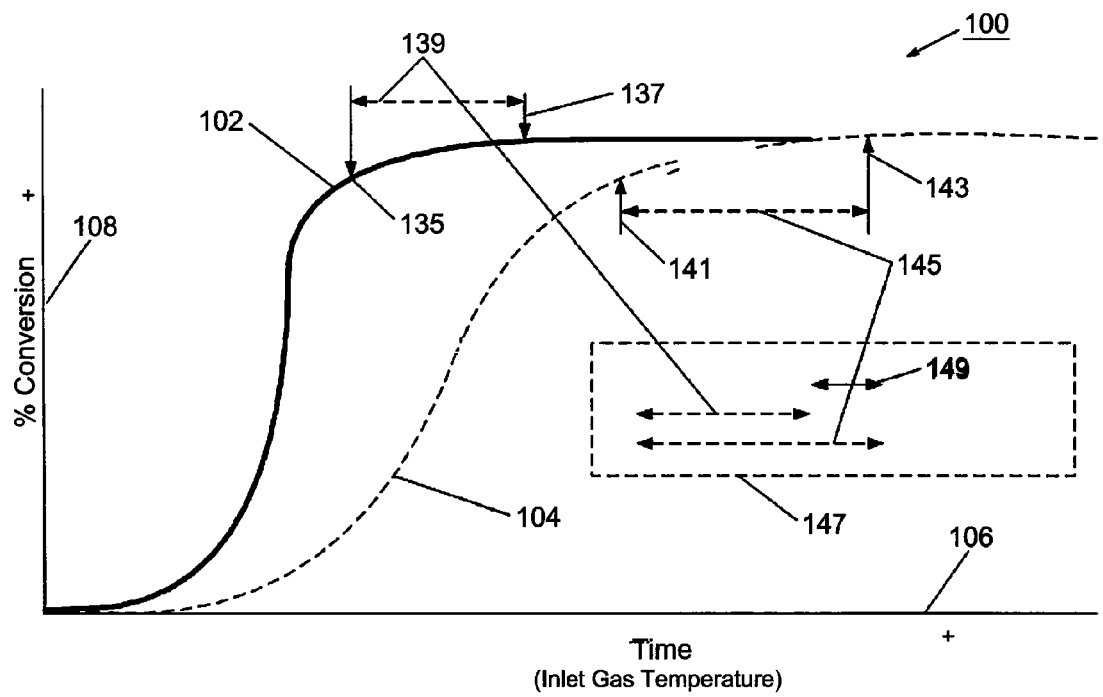

When sufficient substrate material 65, 67 has been heated, the catalytic device 50 has its bulk transfer characteristics dominate and limit conversion efficiency. However, the impact of bulk transfer rate is typically very small. Since the typical catalytic converter has a relatively large thermal mass, it takes time 141 to approach its final conversion efficiency. Since catalytic device 50 has a lower thermal mass and a more effective pore diffusion process, the time 139 to approach its final conversion efficiency is shorter. The difference is shown as time reduction 149. The total time reduction 115 (FIG. 4A) is a summation of time reduction 118 (FIG. 4B), time reduction 132 (FIG. 4C), and time reduction 149 (FIG. 4D). This reduction in time to reach maximum conversion efficiency results in significant pollution prevention, and allows the emission control engineers to design smaller and less expensive devices to meet emissions regulations.

Figure 5A:
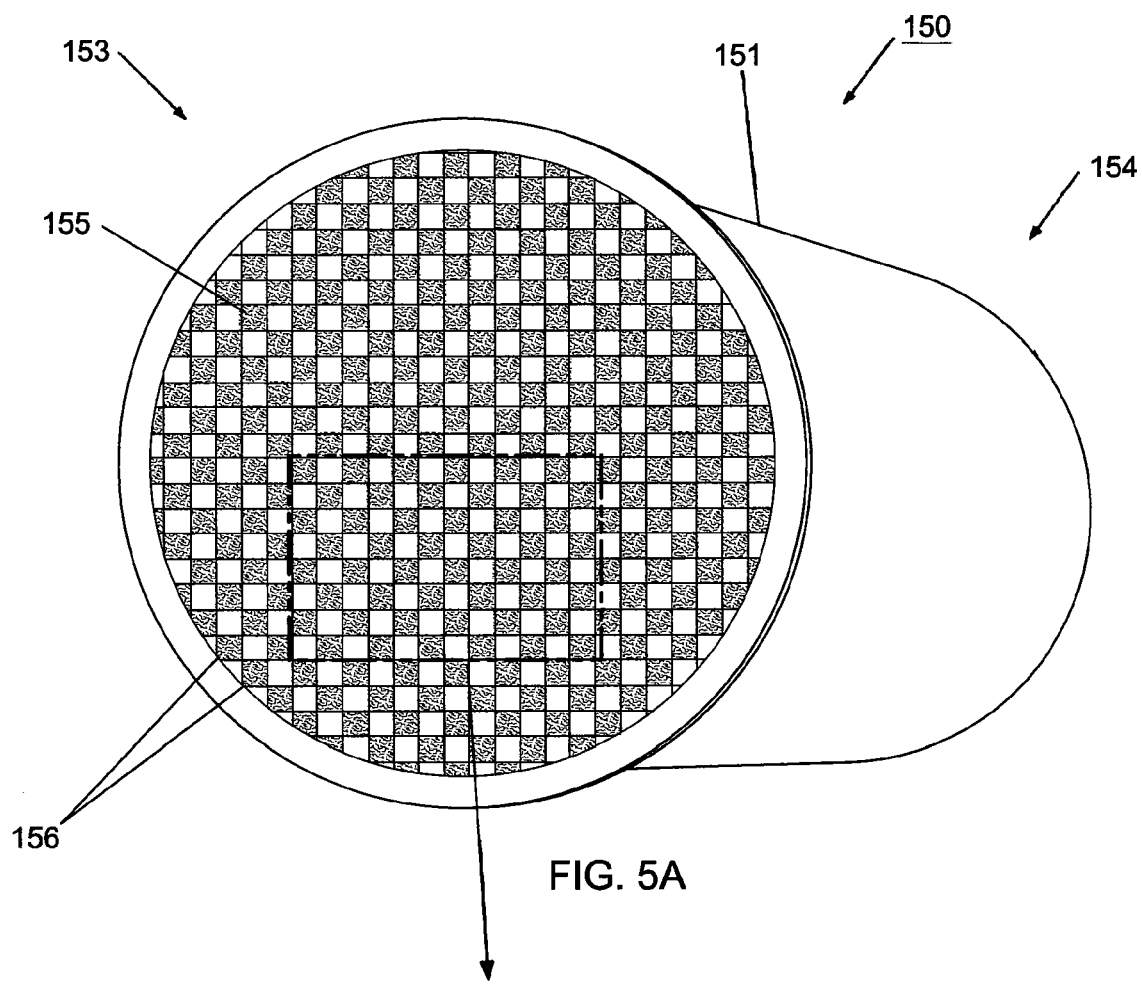
FIG. 5A is an end view of a catalytic device having a monolithic substrate in accordance with the present invention.
Figure 5B:
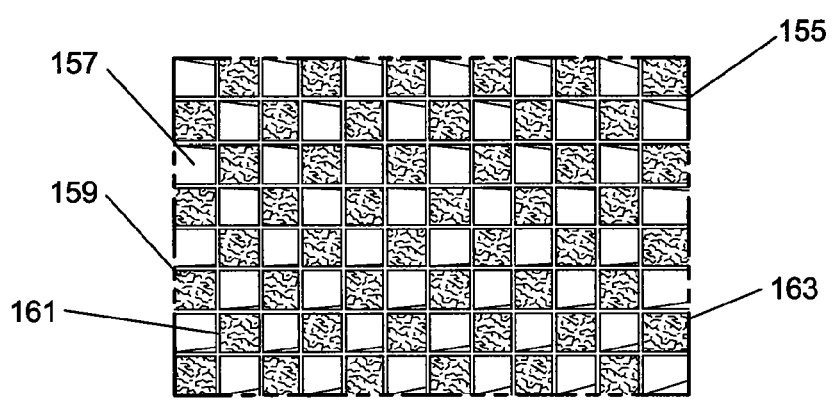
FIG. 5B is an enlarged partial end view of FIG. 5A.

FIGS. 5A and 5B show a catalytic device 150 incorporating fibrous monolithic honeycomb 155 in housing 151. The honeycomb 155 has a set of inlet channels 157 and outlet channels 159 arranged in an alternating pattern. In this embodiment, the alternating pattern is a checkerboard pattern, although other embodiments may incorporate other patterns. Each respective channel 157, 159 defines an open end and an oppositely disposed blocked end. The blocked ends each include a respective blocking member or block 156 disposed therein to impede the flow of gas therethrough. FIG. 5A shows the inlet side 153 of the catalytic device 150. In this way, the open cells function as inlet channels 157. On the inlet side, the other channels 159 are blocked with a blocking material so that no exhaust gas may enter from the inlet side. At the outlet 154 side, the inlet channels 157 are blocked, while the outlet channels 159 are open. FIG. 5B shows in greater detail the channels 157, 159 and the walls 161 separating and defining the channels 157, 159, the blocking material 163 disposed in the ends of the outlet channels 159, and the fibrous material making up the block 155. Typically, the block 155 and blocking material 163 are both made up of non-woven substantially fibrous material; more typically, the block 155 and blocking material 163 have substantially the same composition. However, the block 155 and blocking material 163 may have different compositions and/or even substantially different structures.

Figure 5C:
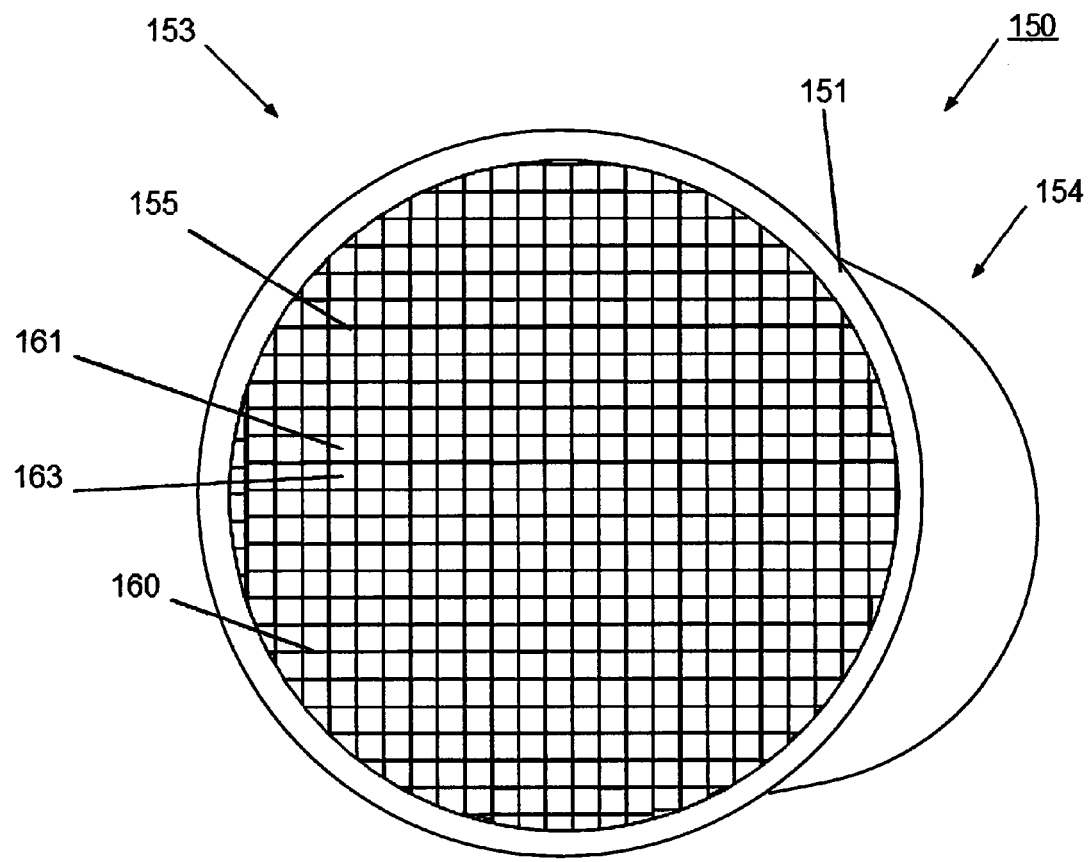
FIG. 5C is a cross sectional mid view of the catalytic device shown in FIG. 5A.

FIG. 5C shows a cross section at a point between the inlet side 153 and the outlet side 154. Here, inlet channels 157 are arranged adjacent to outlet channels 159, with porous walls 160 disposed therebetween. In this way, gas from the inlet channels 157 is urged through walls 160 into adjacent outlet channels 159, and then transported out the outlet port 154.

Figure 5F:
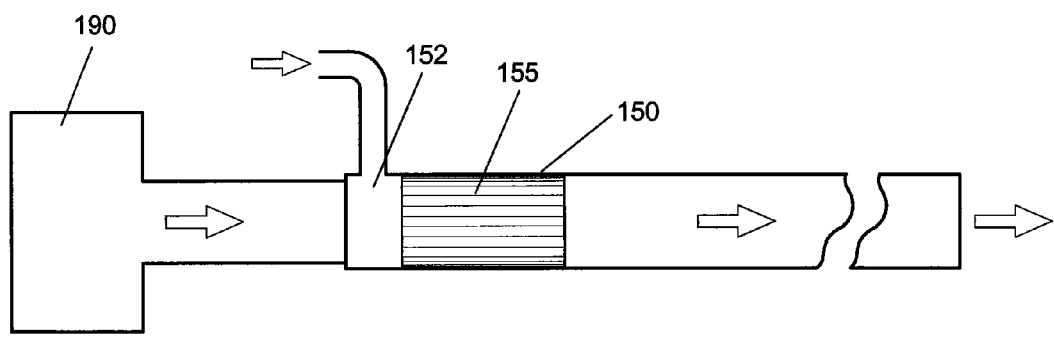
FIG. 5F is a schematic illustration of the device of FIG. 5A as positioned in an exhaust stream flowing from a gasoline engine to the atmosphere.
Figure 5D:
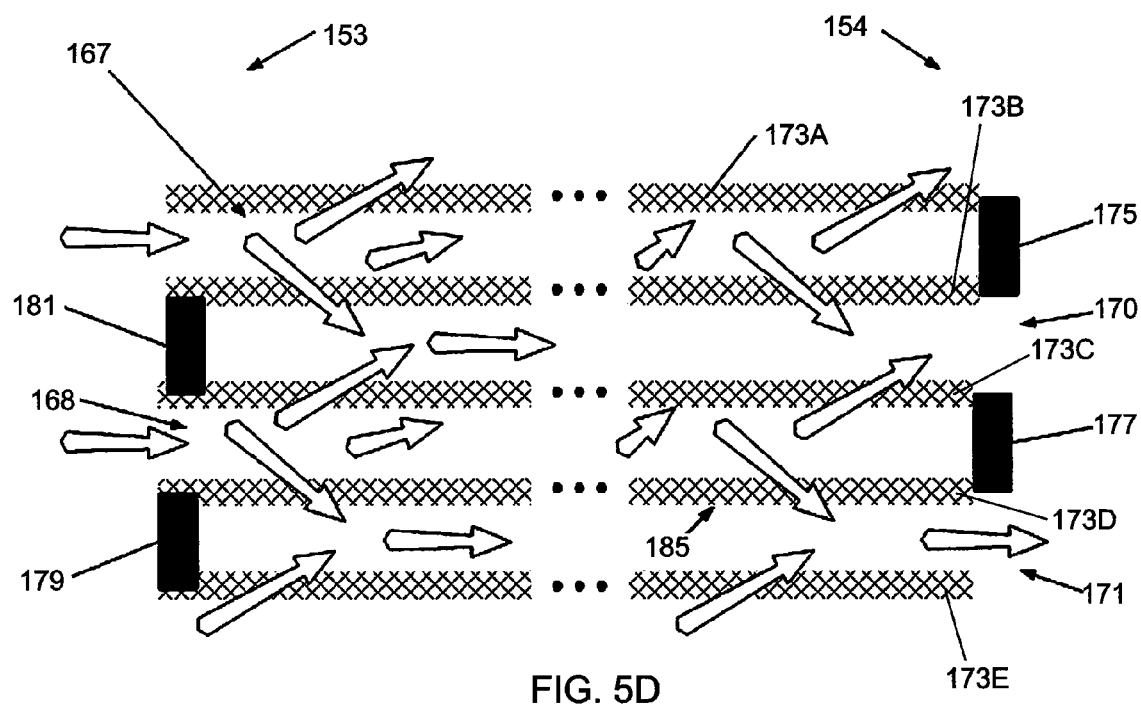
FIG. 5D is an elongated cut-away view of adjacent channels of the catalytic device shown in FIG. 5A.

FIG. 5D shows that inlet channels 167, 168 are separated from adjacent outlet channels 170, 171 by porous walls 173A-E. Also, the inlet channels 167, 168 are blocked at the outlet side 154 by blocks 175, 177, while the outlet channels 170, 171 are blocked at the inlet side 153 by blocks 179, 181. This construction enables gas to move from a respective inlet channel 167, 168 to an adjacent outlet channel 170, 171 for substantially the entire length of the fibrous block 155.

Figure 5E:
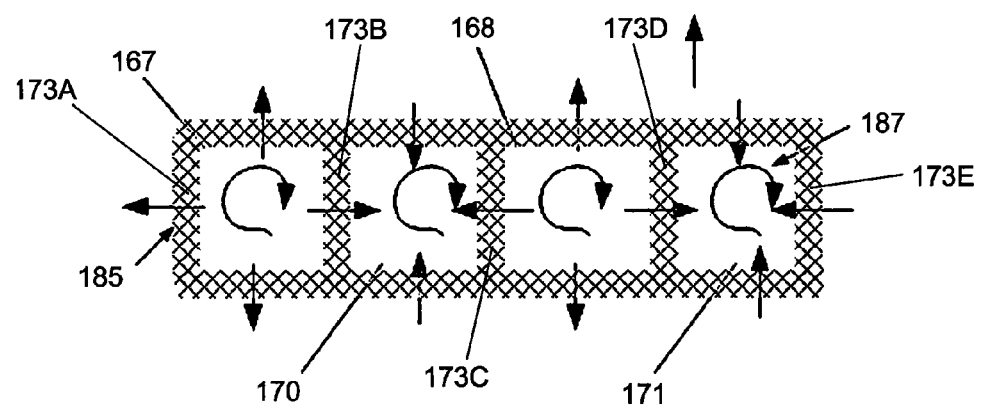
FIG. 5E is a plan cut-away view of adjacent channels of the catalytic device shown in FIG. 5A.

FIG. 5E shows that laminar flow is established inside of channels 167, 168, 170, 171 to facilitate bulk diffusion, while wall flow or pore diffusion is established between channels to facilitate higher reaction rates.

It will be appreciated that the catalytic device 150 may be designed in many physical arrangements. The diameter, length, channel density, blocking pattern, blocking material, blocking material placement, catalytic material, catalyst placement, wall porosity, pore-size, pore-shape, and wall thickness may all be adjusted for application specific needs. Each of these characteristics may affect conversion rate, backpressure, and light off time. The effect of each of these propertied is generally discussed below.

a. In catalytic device 150, improved wall flow enables significant decrease in light-off time by increasing the efficiency and dependence of overall reaction rate on pore diffusion rate. Accordingly, the properties of the channel walls 160 are selected to facilitate a desired rate of pore diffusion activity. For example, it has been found that exhaust gas is more effectively catalyzed when it takes from about a few microseconds to about 2 seconds for the exhaust gas to pass through the channel walls 160. In a typically gasoline engine exhaust, gas may flow at about 180 cubic feet per minute. Accordingly, if the channel wall 160 is formed of a substantially fibrous nonwoven material having a porosity of between about 60 and about 90 percent and a thickness of about 20 mil, then it will take on the order of microseconds for the gas to pass through. Of course, it will be understood that many factors are considered in determining wall thickness, such as wall porosity, permeability, backpressure limitations, required conversion rate, and overall length. The longer residence time of the gasses passing through the converter 10 and the tortuosity of the gasses as they pass therethrough combine to increase the probability of a pollutant species coming into contact with the catalyst 166, and thus being converted into a non-pollutant species. However, excessive tortuosity can also increase the backpressure substantially.

b. The porosity and permeability of the walls 160 is selected to accommodate backpressure limitations, as well as to provided a sufficiently tortuous path so that exhaust gas is urged into contact with catalyst 166. In practice, a porosity of between about 60% and about 90% has provided effective conversion rates, while still enabling sufficiently low backpressure characteristics. This porosity range also contributes to a relatively low thermal mass, which in turn contributes to faster heating and shorter light-off times. It will be understood that other porosities may be selected to support specific backpressure and conversion requirements.

c. The mean pore size and pore size distribution is selected to accommodate required backpressure limitations, as well as to capture particulate pollutants of specific, predetermined sizes, if desired. Typically the washcoat and catalysts are placed inside the pores, and more typically such that they do not block the pores. In a specific construction, the pore diameter is selected to optimize the capture of particulate matter of a size characteristic of that found in a gasoline engine exhaust, which typically range from about 5 nanometers to about 1 micron. Additionally, the mean pore length is also a factor in determining the ability of the porous substrate 155, 161 to capture particulate matter of a given size. Moreover, the pore size distribution may be manipulated to maximize the capture of particles of different sizes. For example, if an exhaust gas contains particle populations characterized by two discrete mean particle sizes, the pore size distribution may be manipulated such that two populations of pores are present, each sized to optimize the capture of a particles of a respective mean size. Such a pore structure could lead to a more efficient depth filter where the particles are captured inside the wall of the substrate and not just on the wall of the substrate. Typical pore-sizes range from 1 micron to 100 microns, and more typically 20-50 microns.

The particles filtered from the exhaust stream would need to be removed from the filter (i.e., the filter would need to be regenerated) at periodic intervals to keep the filter clean, its permeability high, and its conversion efficiency high. In such cases, 'active' or 'passive' regeneration strategies can be employed. In passive regeneration, the particulates captured are burnt of periodically in the presence of the oxidizing catalyst as the temperatures go higher than the soot burning point. In active regenerations, heat has to be supplied to such a catalytic converter to increase the temperature of the soot sufficiently to burn off into primarily CO2 and H2O. Active regeneration also employs fuel-borne catalysts and mechanical devices, such as heat traps, pressure valves, etc. In the case of particulates that have been captured using depth filtration, the efficient contact between the particulates, catalyst and the incoming gas allows for fast, efficient and more complete burn off of particulates and regeneration.

In one configuration, the catalytic device 150 is fluidically connected to the exhaust stream coming from a gasoline engine 190 and also to a fuel injection port 152 that, from time to time, is used to inject fuel into the catalytic honeycomb monolith 155. (See FIG. 5F). The injected fuel immediately burns and heats the catalytic device 150 sufficiently to substantially oxidize/burn off collected particulate matter. This regeneration process may be done periodically, or may be initiated response to a measured parameter, such as a threshold temperature or backpressure. The increased toughness contributed by the tangled fibrous nature of the honeycomb monolith 155 material facilitates more frequent regenerations; the toughness and highly refractory nature of the honeycomb monolith 155 material allows for placement of the device 150 closer to the engine (and in a higher-temperature portion of the exhaust stream or where larger thermal shock to the material may be expected) than otherwise would be possible with known converter devices. This allows for a faster light-off time for the device 150 and thus for a reduction in emitted pollution.

d. The blocking pattern and block position is selected according to the physical arrangement of the catalytic device 150, as well as backpressure and conversion requirements dictated by its operating environment. By adjusting the blocking pattern or the blocking position, the relative volume or shape of the input or output channels 157, 159 may be adjusted. For example, by making more inlet channel volume available, backpressure may be reduced. In another example, the blocks 156 may be arranged to adjust how much area is used for wall flow, and how much area is used for channel flow. This allows the device designer to adjust the relative level of pore diffusion as compared to bulk diffusion. In this regard, the designer may, for example, position blocks 156 in an arrangement that provides more channel flow and less wall flow. This provides for more laminar flow (bulk diffusions), with less wall flow (pore diffusion), but may decrease backpressure. Similarly, the channel can have a variety of size and shapes, depending on back-pressure, nature of reactions, and the ash storage capacity needed.

e. Channel density is selected to maximize exhaust gas passage and such that laminar flow transport of pollutant species to the catalyst interface is optimized while back pressure increases are minimized. The fibrous nature of the monolith material (i.e., tangled, interconnected fibers sintered or otherwise bonded at most, if not substantially all, of their intersection points) allows for an exceptionally strong and tough substrate material having a relatively high degree of porosity (at least about 50 percent porous, and more typically between about 60 percent and about 90 percent porous) while simultaneously remaining lightweight and defining a relatively low thermal mass. These properties result in a tough and relatively non-brittle material having sufficient inherent porosity and permeability so as to not contribute as significantly to backpressure as traditional sintered cordierite substrates, especially if the wall flow varieties of cordierite substrates were employed). Likewise, the lengths of the channels may be relatively short, since the combination of wall-flow and high porosity make exposure to catalyst more likely. Thus, relatively short channels 157, 159 may be formed in the present material at a relatively high channel density (i.e., many channels of smaller cross-sectional areas) without substantially increasing backpressure to an engine fluidically connected thereto. Likewise, less channel density (cell density) substrates with thicker walls may also be constructed for increasing residence time of exhaust gas in the pores of the wall.

f. Catalytic material is selected to facilitate the desired reactions of pollutant species into non-pollutant species at relatively high rates at low temperatures. Typically, for internal combustion engine applications, those species are nitrogen oxides ($NO_x$), carbon monoxide (CO) and various hydrocarbons (HC) present in gasoline or other ICE exhaust stream. Typically, the number of discrete catalysts present is equal to the number of pollutants desired to be eliminated from the exhaust stream, although if one catalyst can function to catalyze the reactions of two or more pollutants into non-pollutants, a lower number of catalysts may be required. For example, a combination of platinum and rhodium may be present on the substrate surface and/or pore walls to catalyze the reaction of $NO_x$ into $N_2$ and $O_2$, to catalyze the reaction of CO into $CO_2$, and to catalyze the reaction of HCs into $CO_2$ and $H_2O$. More complex catalysts that include perovskite structures, precious metals, base-metal oxides, rare-earths, and the like may also be used. For other reactions, the catalysts may even consist of biological molecules such as enzymes. The catalysts may be applied as discrete and spaced coatings, as a physical mixture, as discrete stripes or strips, or in any convenient way that results in catalytic interfaces present on wall and pore surfaces. Thus, particular channels or channel portions may be coated with one type of catalyst, while other channels or channel portions may be coated with another type of catalyst. The washcoat and the catalysts may also typically be disposed onto individual fibers and at the junctions between the individuals fibers in the wall of the substrate.

g. It will be appreciated that the design criteria discussed in a-f above is provide only as a set of general guidelines. It will be understood that many tradeoffs and compromises are typically made during the design of a catalytic device. The catalytic device 150 is a highly flexible design, and may be built in many specific constructions.

Figure 6A:
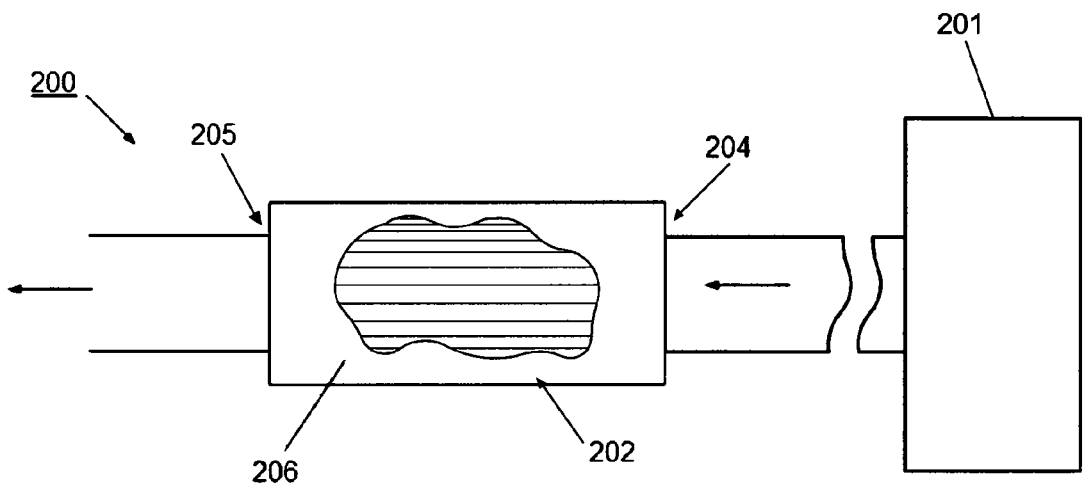
FIGS. 6A and 6B is a diagram of a catalytic exhaust system in accordance with the present invention.
Figure 6B:
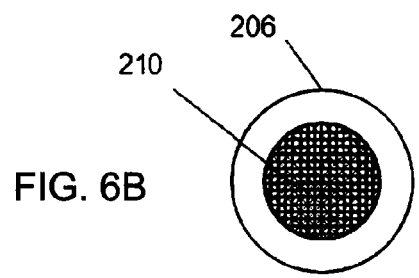

FIGS. 6A and 6B show an exhaust system 200 operationally coupled to a catalytic device 202 that operates as described above. Exhaust gas is generated by engine 201 and urged through exhaust gas pathway 203 and through catalytic device 202, which is fluidically connected as part of the pathway 203. Exhaust gas inlet 204 and exhaust gas outlet 205 are defined by housing 206. Exhaust gas enters the catalytic device 202 via exhaust gas inlet 204, interacts with fibrous walls 207 therein, and exits through exhaust gas outlet 205.

Figure 7A:
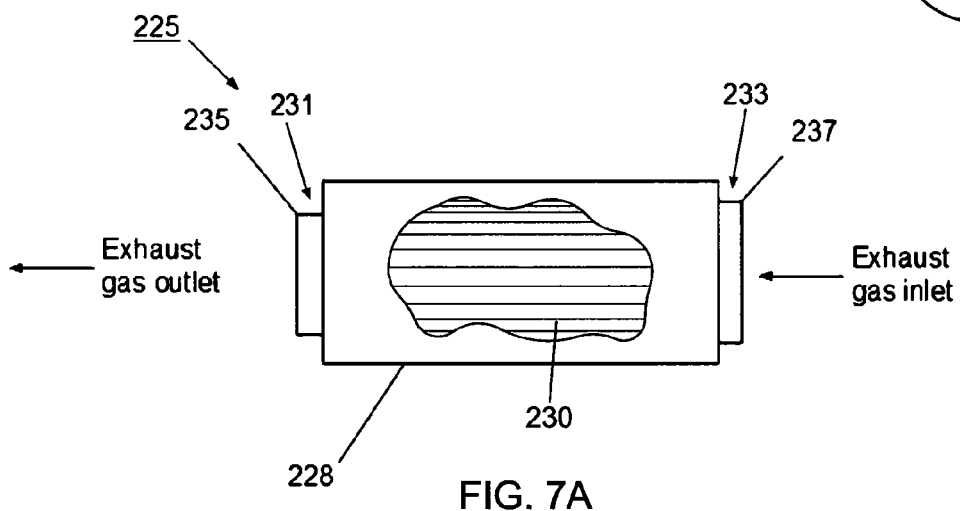
FIG. 7 is a diagram of a replacement catalytic device in accordance with the present invention.
Figure 7B:
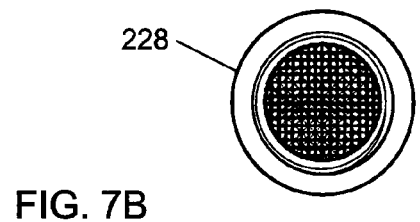

FIG. 7 shows a catalytic device 225 configured for application as an aftermarket or repair device. The device 225 includes an inner fibrous wall 227 confined within a housing 228. The housing 228 defines an exhaust inlet 231 and an exhaust outlet 233. The housing 228 further defines an inlet coupler 235 and an outlet coupler 237 that are configured to connect to an existing exhaust system. The couplers 235, 237 can be constructed to support any convenient coupling type, such as a welded, frictional, and/or threaded coupling.

Figure 8:
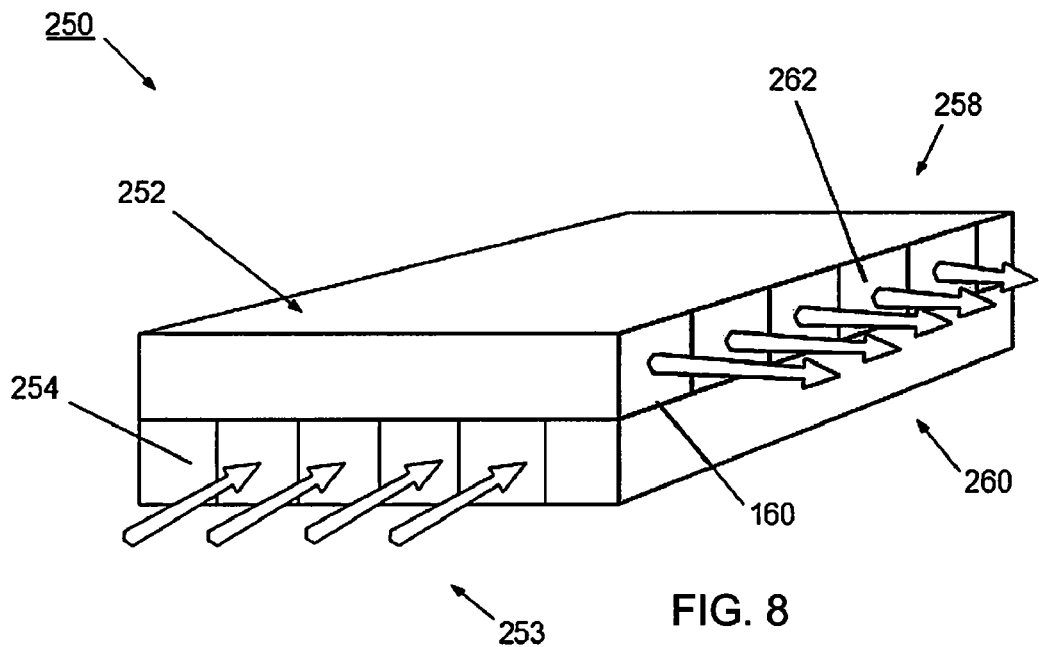
FIG. 8 is a diagram of a cross-flow catalytic device in accordance with the present invention.

FIG. 8 schematically illustrates a cross-flow filter 250 having layered sets of perpendicular channels 252. A set of inlet channels 254 receives a liquid or gas having at least two components (herein given as 'A'+'B'). The walls between the inlet channels 254 and outlet channels 262 are constructed from porous substantially fibrous material and are coated with a catalyst to facilitate the separation of or reaction of substance B in to a new, non-B species, while simultaneously passing substance A therethrough substantially unchanged. In this way, at least some of the B material is removed from the fluid flow through the filter 250. The fluid emerging from the filter outlet 260 thus has a lower concentration of the B species and a higher concentration of the A species. It will be understood that additional B material may be removed (i.e., the concentration of B may be still further reduced) by increasing the length of the filter, by increasing the number of channels, or by increasing the amount of reactive coating.

Figure 9:
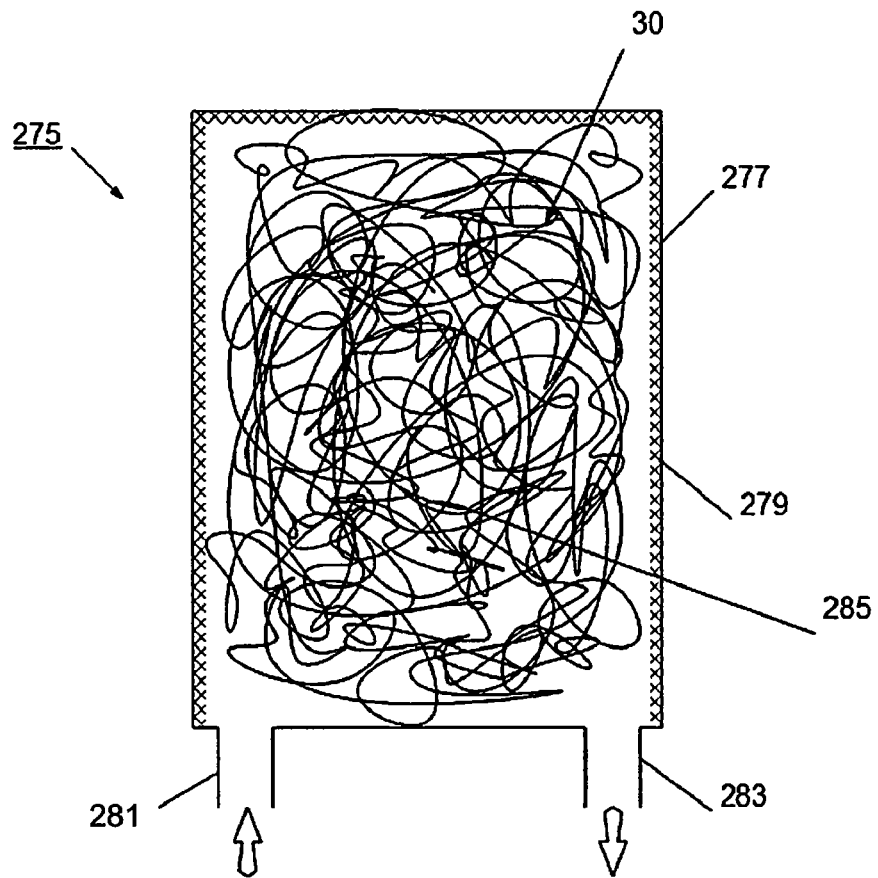
FIG. 9 is a diagram of a catalytic device in accordance with the present invention.

FIG. 9 shows a catalytic device 275 similar to catalytic device 10, except that the inlet channels and outlet channels are randomly provided. More particularly, a fibrous block 285 has been positioned within a housing 277 and is characterized by a high porosity, thereby enabling a random flow of gas through the block 285. The housing 277 may optionally feature a fibrous wall 279 (of the same or different composition as the block 285) connected to the housing interior. The block 285 typically has a porosity gradient to encourage a longer or more tumultuous gas flow path. Housing 277 further includes a gas inlet port 281 and a spaced gas outlet port 283, defining the endpoints of the gas flow path through the block 285.

Figure 10:
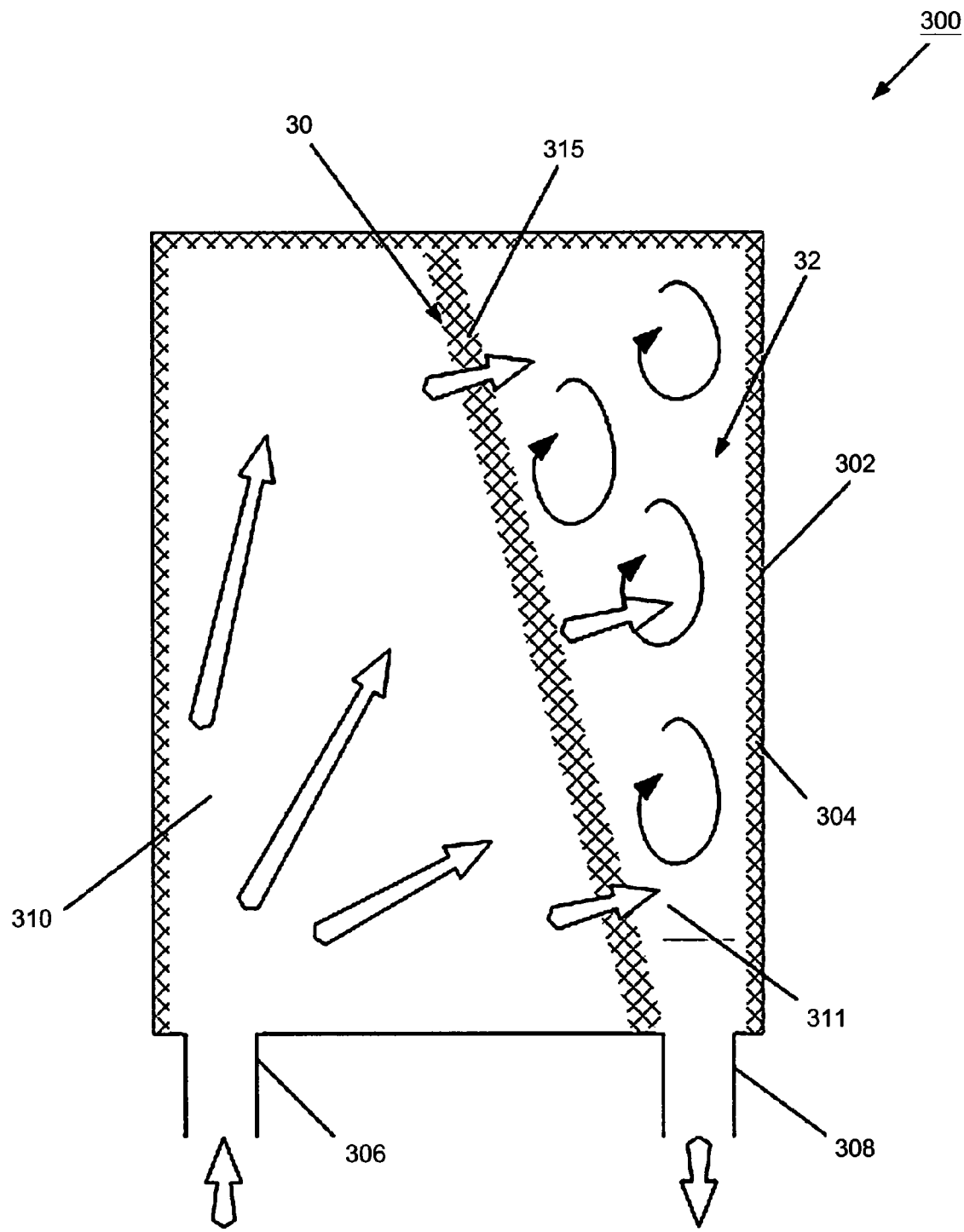
FIG. 10 is a diagram of a catalytic device in accordance with the present invention.

FIG. 10 shows a catalytic device 300 similar to catalytic device 10, except that the inlet channel 310 is larger than the outlet channel 311. Housing 302 includes an inner fibrous wall coating 204 and defines spaced inlet and outlet ports 306, 308 that further define the endpoints of the gas flow path through the device 300, including through the fibrous wall 315 positioned therein. Backpressure may be reduced by providing larger, or more, inlet channels 310 as compared to the outlet channels 311.

Figure 11:
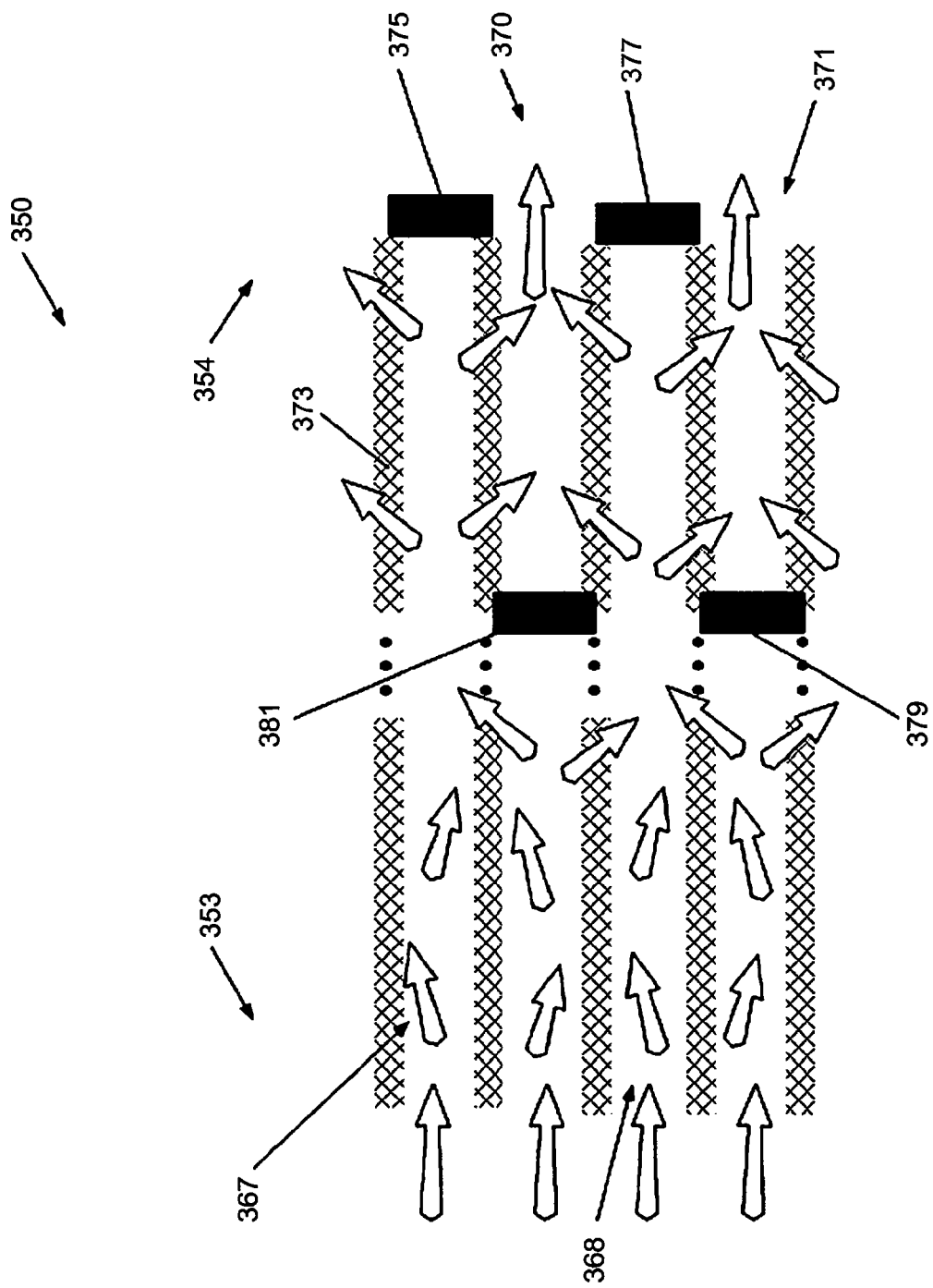
FIG. 11 is a cross sectional diagram of channels for a catalytic device in accordance with the present invention.

FIG. 11 shows a catalytic device 350 similar to catalytic device 150, except blocks 379, 381 for the respective outlet channels 371, 370 are positioned spaced away from the channel ends/exhaust outlet 354. Channels 367, 368, 370 and 371 are still defined by walls 373 and fluidically connected between exhaust inlet 353 and exhaust outlet 354. However, by positioning blocks 379, 381 spaced away from the channel ends, additional capacity is provided in adjacent inlet channels 367, 368, thus allowing for a reduction in backpressure. Also, the area provided for laminar flow and bulk diffusion is increased.

In addition to the faster light-off time and more efficient conversion of pollutants to nonpollutants afforded by the fibrous and porous nature of the catalyst support substrate materials used herein, the fibrous and porous nature of the devices described hereinabove also tend to dampen and attenuate sound and noise generated by the associated engine and gas flow. Thus, the devices are additionally attractive as their use tends to reduce or minimize the need for extraneous sound muffling or baffling devices.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A engine exhaust system for catalytically converting carbon monoxide, nitrous oxide, and hydrocarbon pollutants into non-pollutant species and for trapping particulate matter, comprising:
    a engine exhaust;
    a housing;
    an inlet port formed in the housing and fluidically connected to the gasoline engine exhaust;
    an outlet port formed in the housing and fluidically connected to the atmosphere;
    a plurality of inlet channels in the housing;
    a plurality of outlet channels in the housing arranged adjacent to the inlet channels;
    a plurality of substantially fibrous non-woven porous walls comprising intertangled refractory fibers separating the inlet channels from the outlet channels in the housing; and
    at least one catalyst material disposed on the porous walls, the at least one catalyst material adapted to convert carbon monoxide, nitrous oxide, and hydrocarbons into non-pollutant species, and wherein the plurality of substantially fibrous non-woven porous walls are adapted to trap particulate matter.

2. The engine exhaust system according to claim 1, wherein exhaust gas flowing through the housing must pass through at least one porous wall.

3. The engine exhaust system according to claim 1, further including a block in at least some of the inlet channels, each block positioned in respective inlet channels between the inlet port and the outlet port.

4. The engine exhaust system according to claim 1, wherein the inlet channels, the outlet channels, and the porous walls are oriented substantially in parallel.

5. The engine exhaust system according to claim 1, wherein the inlet channels and the outlet channels are substantially the same size.

6. The engine exhaust system according to claim 1, wherein the inlet channels are wider than the outlet channels.

7. The engine exhaust system according to claim 1, wherein the first and second catalyst materials are spaced from one another.

8. The engine exhaust system according to claim 1 wherein the first and second catalyst materials have the form of discrete strips.

9. The engine exhaust system according to claim 1 wherein the first and second catalyst materials are layered.

10. The engine exhaust system according to claim 1, wherein the substantially fibrous non-woven porous walls are characterized by pores substantially ranging from about 1 micron to about 100 micron.

11. The engine exhaust system according to claim 1, wherein the substantially fibrous non-woven porous walls are characterized by porosities ranging from about 60 percent to about 90 percent.

12. The engine exhaust system according to claim 1, wherein the substantially fibrous non-woven porous walls further comprise a first wall having a first porosity and a second wall having a second porosity, wherein the first porosity is greater than the second porosity.

13. The engine exhaust system according to claim 1, wherein the substantially fibrous non-woven porous walls further comprise a first wall having a first thickness and a second wall having a second thickness, wherein the first thickness is greater than the second thicknesses.

* * * * *